(12) United States Patent
Nellis

(10) Patent No.: US 6,929,443 B1
(45) Date of Patent: Aug. 16, 2005

(54) LIFTING AND TELESCOPING DOLLY

(76) Inventor: LeRoy William Nellis, 6418 Zadock Woods, Austin, TX (US) 78749

( * ) Notice: Subject to any disclaimer, the term of this patent is extended or adjusted under 35 U.S.C. 154(b) by 0 days.

(21) Appl. No.: 10/064,958

(22) Filed: Sep. 4, 2002

(51) Int. Cl.[7] .............................................. B62B 3/04
(52) U.S. Cl. ...................... 414/449; 414/490; 280/47.2
(58) Field of Search ................................ 414/444, 448, 414/449, 490; 280/47.17, 47.2

(56) References Cited

U.S. PATENT DOCUMENTS

| | | | | |
|---|---|---|---|---|
| 2,598,489 A | * | 5/1952 | Bayer et al. ................ 414/467 |
| 3,191,786 A | * | 6/1965 | Langrell ..................... 414/444 |
| 3,896,904 A | * | 7/1975 | Walker ....................... 187/231 |
| 3,907,138 A | * | 9/1975 | Rhodes ....................... 414/448 |
| 3,913,762 A | * | 10/1975 | Alexander .................. 414/490 |
| 3,997,182 A | * | 12/1976 | Mortenson .............. 280/47.27 |
| 4,257,729 A | * | 3/1981 | Morissette .................. 414/490 |
| 4,728,245 A | * | 3/1988 | Shelton ...................... 414/490 |
| 4,737,065 A | * | 4/1988 | Ju .............................. 414/490 |
| 5,114,118 A | | 5/1992 | Schrader |
| 5,120,183 A | * | 6/1992 | Phillips ...................... 414/490 |
| 5,207,439 A | * | 5/1993 | Mortenson ................. 280/47.2 |
| 5,358,217 A | | 10/1994 | Dach |
| 5,379,814 A | * | 1/1995 | Posly ......................... 141/351 |
| 5,839,876 A | | 11/1998 | McCarthy et al. |
| 5,947,491 A | * | 9/1999 | Meier ....................... 280/47.2 |
| 5,967,734 A | * | 10/1999 | Liu ............................. 414/490 |
| 5,975,826 A | * | 11/1999 | Scholder ..................... 414/444 |
| 6,406,248 B1 | * | 6/2002 | McGill et al. .............. 414/634 |
| 6,561,745 B2 | * | 5/2003 | Rountree ..................... 414/490 |
| 2001/0038786 A1 | * | 11/2001 | Kim ............................ 414/490 |
| 2004/0076501 A1 | * | 4/2004 | McGill et al. .............. 414/607 |

FOREIGN PATENT DOCUMENTS

JP      5-254442      * 10/1993

* cited by examiner

*Primary Examiner*—James W. Keenan
(74) *Attorney, Agent, or Firm*—David Allen Hall

(57) ABSTRACT

A lifting and telescoping dolly for facilitating the moving of bulky objects into and out of attics by one operator acting alone. The collapsible dolly opens into a self-supporting A-frame with four support points. It has wheels and a brake system for positioning the dolly beneath an attic entry. From ground level a winch elevates the telescoping upper part of the dolly frame into the attic where it is firmly supported. From the attic a second winch elevates the load into the attic.

1 Claim, 6 Drawing Sheets

US 6,929,443 B1

LIFTING AND TELESCOPING DOLLY

FIELD OF THE INVENTION

The present invention relates to the field of devices used for transporting objects, more specifically to the field of hand-operated, wheeled devices. Such devices are commonly referred to as hand trucks, carts, or dollies.

SUMMARY OF THE INVENTION

No state-of-the-art dolly offers all the features of the the present invention. The present invention features a support member that makes it possible to hoist an object at various angles other than vertical, thus enabling the hoisting of an object into an attic having a pull-down staircase. The present invention enables one-person operation. It also provides an integral top support member that attaches to a fixed part of the attic construction, such as a rafter or beam.

The present invention provides a dolly the height of which can be telescoped from approximately that of dollies commonly used for moving furniture, household goods, appliances, and commercial stock to a height sufficient for hoisting objects from a floor or ground surface into an attic.

The present invention provides a dolly with a foldable support member that permits hoisting of objects at angles inclined from the vertical.

The present invention provides a telescoping dolly that incorporates a means of attaching the topmost section of the dolly to a structural member near an attic access in order to safely stabilize the dolly during the operation of hoisting an object from a floor or ground surface into an attic.

The present invention provides a dolly that enables an operator, acting alone, to safely hoist an object into an attic, remove the object from the dolly, and place the object on the attic floor.

The present invention provides a dolly with a lockable, collapsable support member that permits hoisting of objects at angles inclined from the vertical.

The present invention provides a dolly with a braking system.

The present invention provides a dolly that collapses into a compact profile that can be conveniently transported and stored.

The present invention provides a dolly of simple and lightweight, yet durable, construction that can be inexpensively manufactured.

DESCRIPTION OF THE PREFERRED EMBODIMENT

Figure 1:
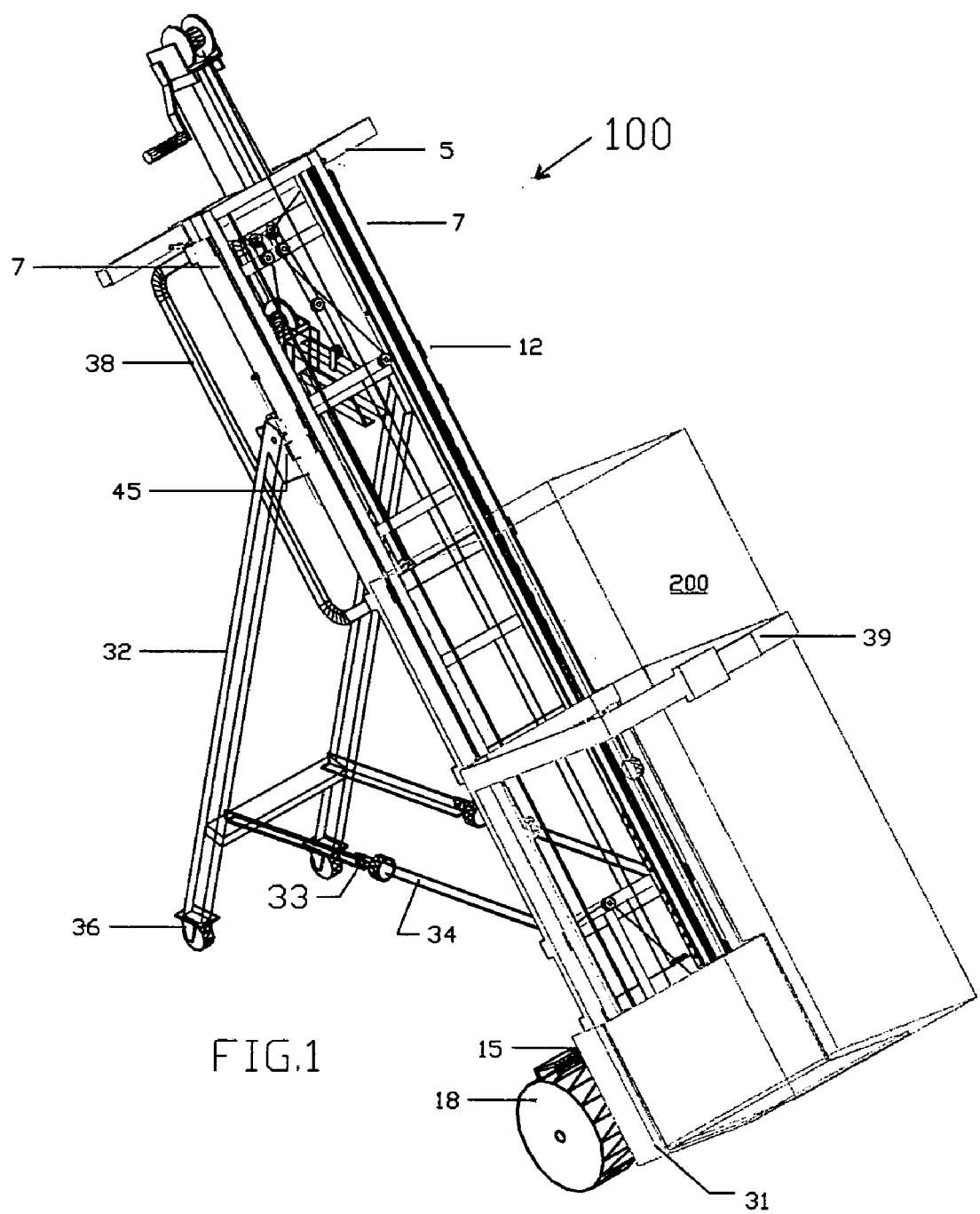
FIG. 1 is a front isometric drawing of the dolly of the present invention loaded with a phantom load.

FIG. 1 illustrates a preferred embodiment of the lifting and telescoping dolly 100 of the present invention, the function of which is to transport and hoist a load 200 resting on base member 31 and held to the front face of main member 12 with releasable strap 39. Dolly 100 is moveable via an axle assembly and wheels 18 attached near the bottom edge of main member 12. When necessary, rolling transport of dolly 100 is checked by operator-activation of braking system 15 that with a commonly understood lever-actuated system of cables applies a compressive force to some area of axle and wheel assembly 18.

Support member 32 is pinned or otherwise attached to pivot brackets 45 attached to main member 12. One end of each of the two telescoping support struts 34 is pinned, hinged, or otherwise rotatably attached to support member 32, and the other ends of support struts 34 are slidably attached to main member 12 so that support member 32 may be positioned at various angles with respect to main member 12, and locked in position with locking devices 33 such as pins, locknuts, or over-center clamps that when engaged maintain support member 32 in a position fixed relative to main member 12. Two support axle and wheel assemblies 36, located at the bottom edge of support member 32, in conjunction with axle and wheel assembly 18, facilitate rolling transport of dolly 100.

Two handles 38, attached to the rear face of main member 12, provide means for an operator to grasp and maneuver dolly 100 during transport. Handles 38 also provide support when support member 32 is folded parallel to main member 12 and dolly 100 is lowered and positioned such that it is essentially parallel to the floor or ground surface.

Figure 6:
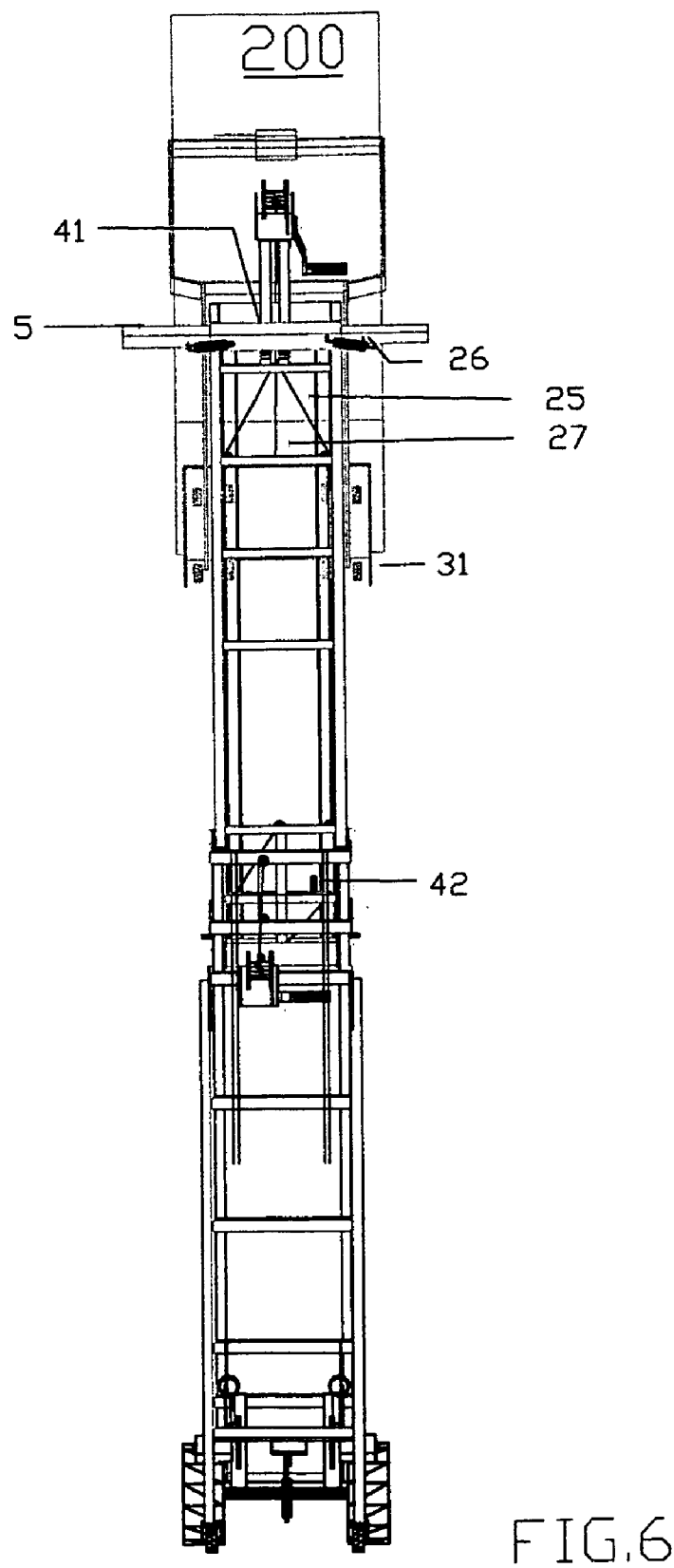
FIG. 6 is a rear isometric drawing of the dolly of the present invention telescoped to full extension and loaded with a phantom load hoisted to its maximum height.

FIGS. 1 and 6 show that the illustrated embodiment includes a receiver tube 41 near the top edge of main member 12. Each end of receiver tube 41 receives a support arm 5 capable of sliding from a position recessed inside receiver tube 41 to a position substantially exposed but still engaged with receiver tube 41.

Figure 2:
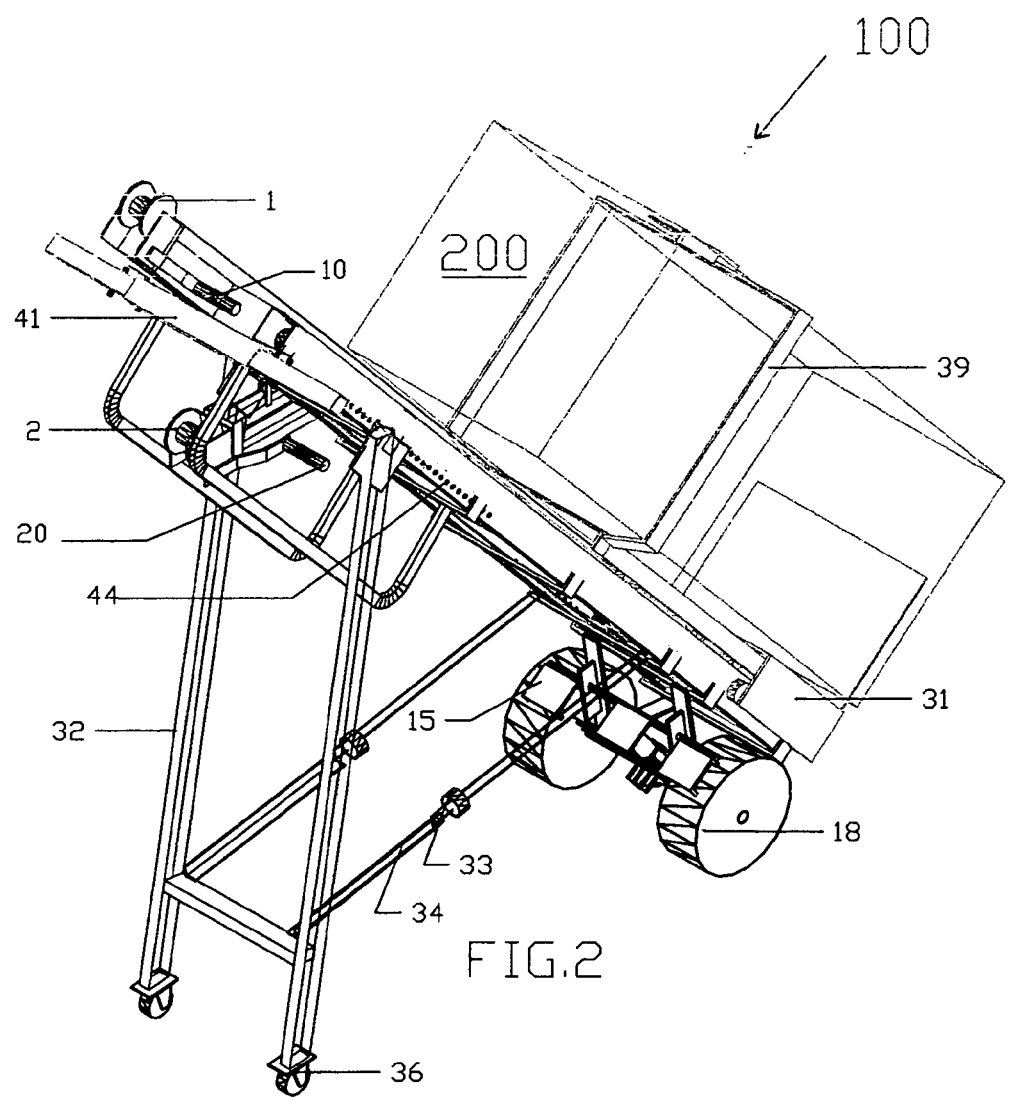
FIG. 2 is a rear isometric drawing of the dolly of the present invention loaded with a phantom load.

FIG. 2 shows winches 1 and 2, and their respective cranks 10 and 20. Winch 2, attached slightly below the top edge of main member 12, is turned by an operator with crank 20. Turning of winch 2 causes cable 21 (see FIGS. 1 and 3), attached to the drum of winch 2 and led through a system of commonly understood pulleys and guides to the bottom of secondary member 7, to slide secondary member 7 (see FIGS. 1 and 4) inside main member 12. Secondary member 7 is a rigid tubular frame, the long sides of which are captured by but can slide, and, assisted by wheels or bearings, roll, in the long sides of main member 12, constructed of C-section beams.

An operator can load an object 200 onto base member 31, secure it to dolly 100 with adjustable attachment strap 39, and transport dolly 100 and its load to a position near an attic access. The operator can rotate support member 32 away from its transport and storage position that is substantially adjacent and parallel to main member 12. Such rotation extends foldable support struts 34, and the operator can engage locking devices 33 so as to orient main member 12 in a substantially A-frame configuration. The operator can activate and lock brake system 15 that forces brake pads against the dolly wheels and prevents further rolling transport of dolly 100.

With winch 2, an operator can extend secondary member 7 from main member 12 until the bottom edge of secondary member 7 is close to the top edge of main member 12. Pins (not shown) can be inserted into holes 44 on both long sides of main member 12 and through mating holes (not shown) on the long sides of secondary member 7 to prevent secondary member 7 from further movement with respect to main member 12 until the pins are removed.

Figure 3:
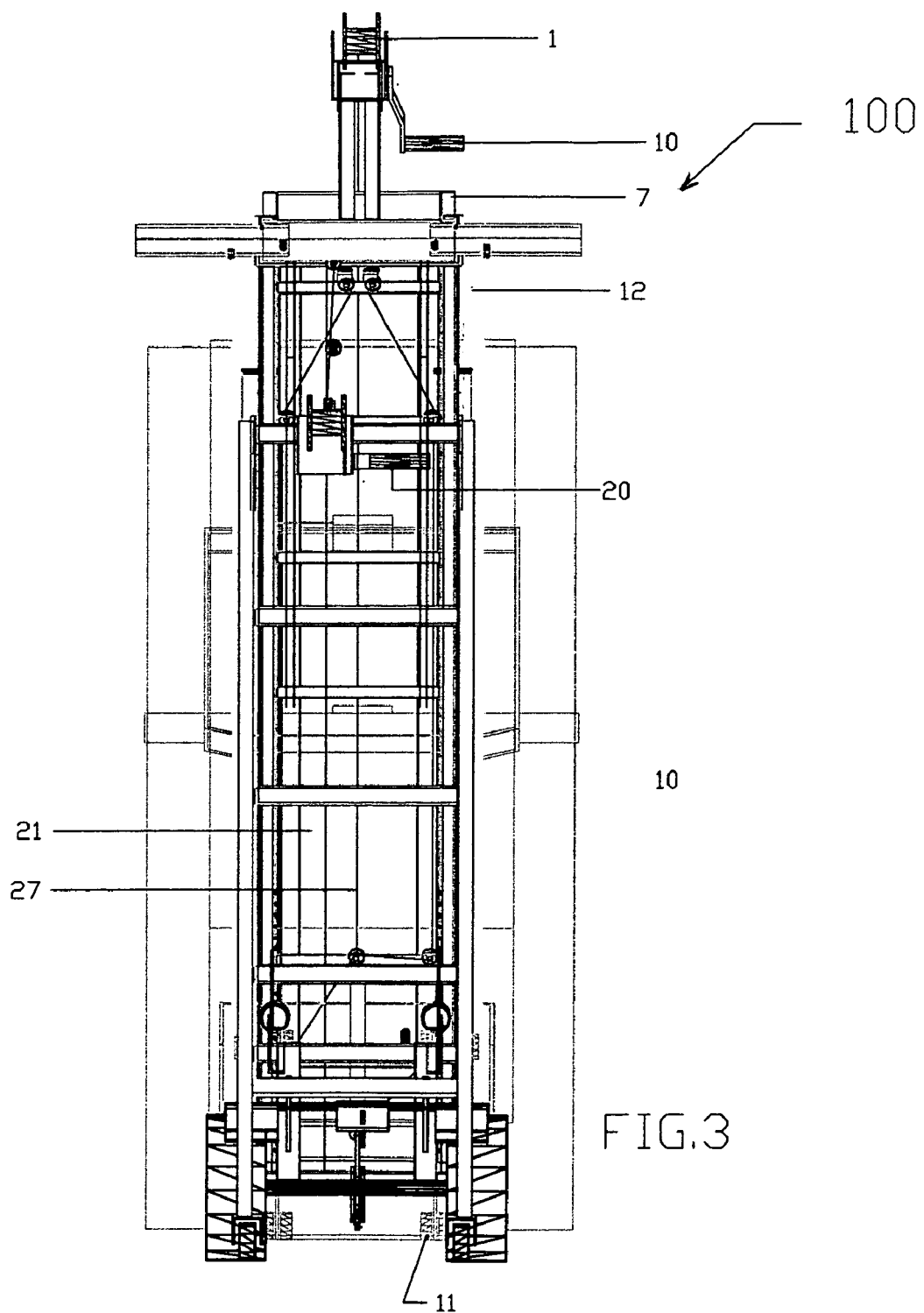
FIG. 3 is a rear orthogonal drawing of the dolly of the present invention with the rear support member folded inward and flat against the rear face of the main member, and the phantom load resting on the base member that is flat on the floor or ground surface.

FIG. 3 shows winches 1 and 2 and their respective cables 27 and 21. Wheels 11 and wheels 10 (see FIG. 4) are attached to secondary member 7 and engage the insides of the C-section beams that make up the long sides of main member 12, thus facilitating telescoping of secondary member 7 with respect to main member 12.

Figure 4:
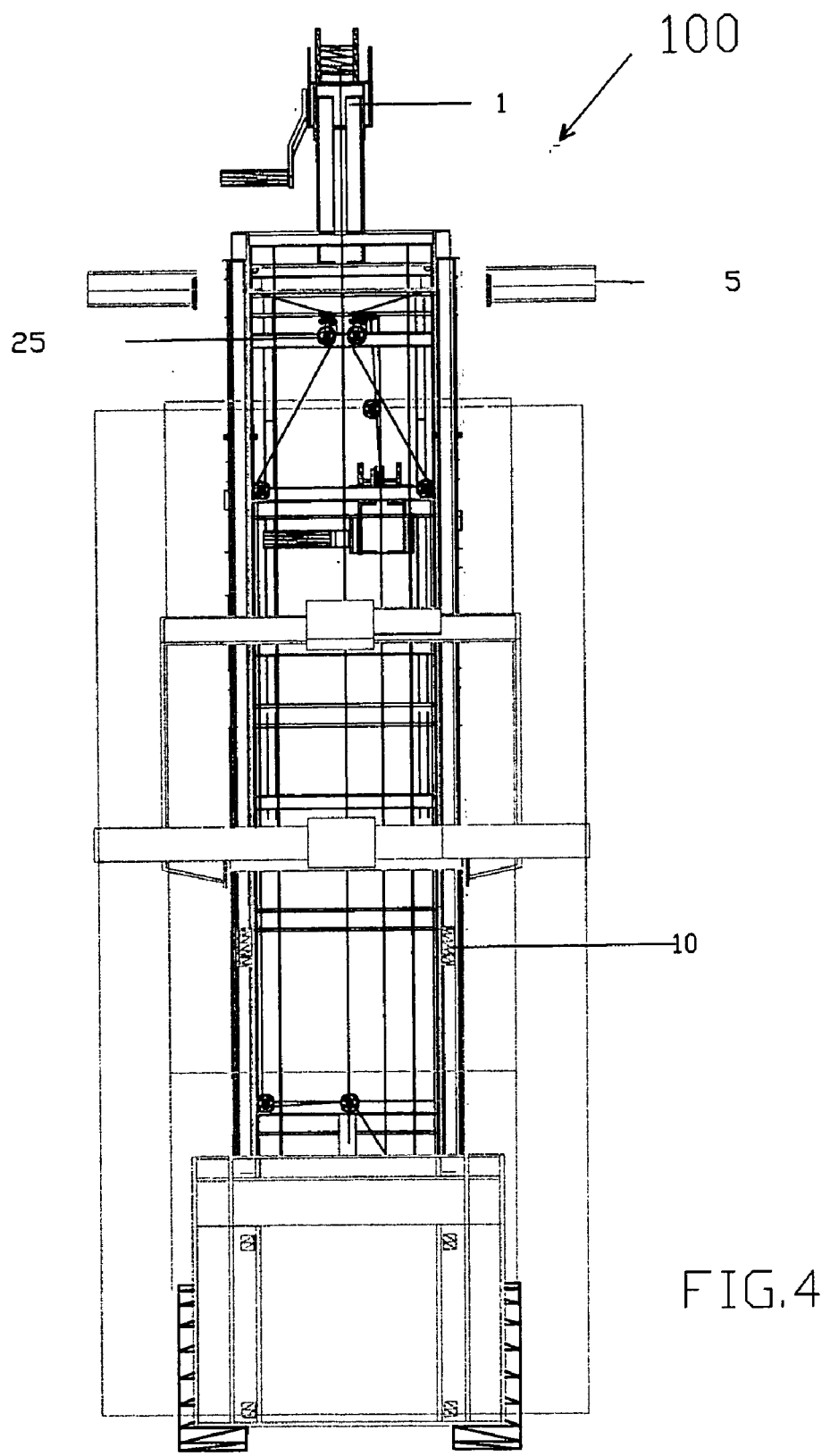
FIG. 4 is a front orthogonal drawing of the dolly of the present invention with the rear support member folded inward and flat against the rear face of the main member, and the phantom load resting on the base member that is flat on the floor or ground surface.

FIG. 4 shows one set of wheels 10 that, along with the set of wheels 11 (see FIG. 3), facilitates the telescoping movement of secondary member 7 within main member 12. FIG. 4 also shows a system of cables and pulleys 25 that controls the position of support arms 5 in receiver tube 41 (see FIGS. 1 and 2) as discussed below.

Figure 5:
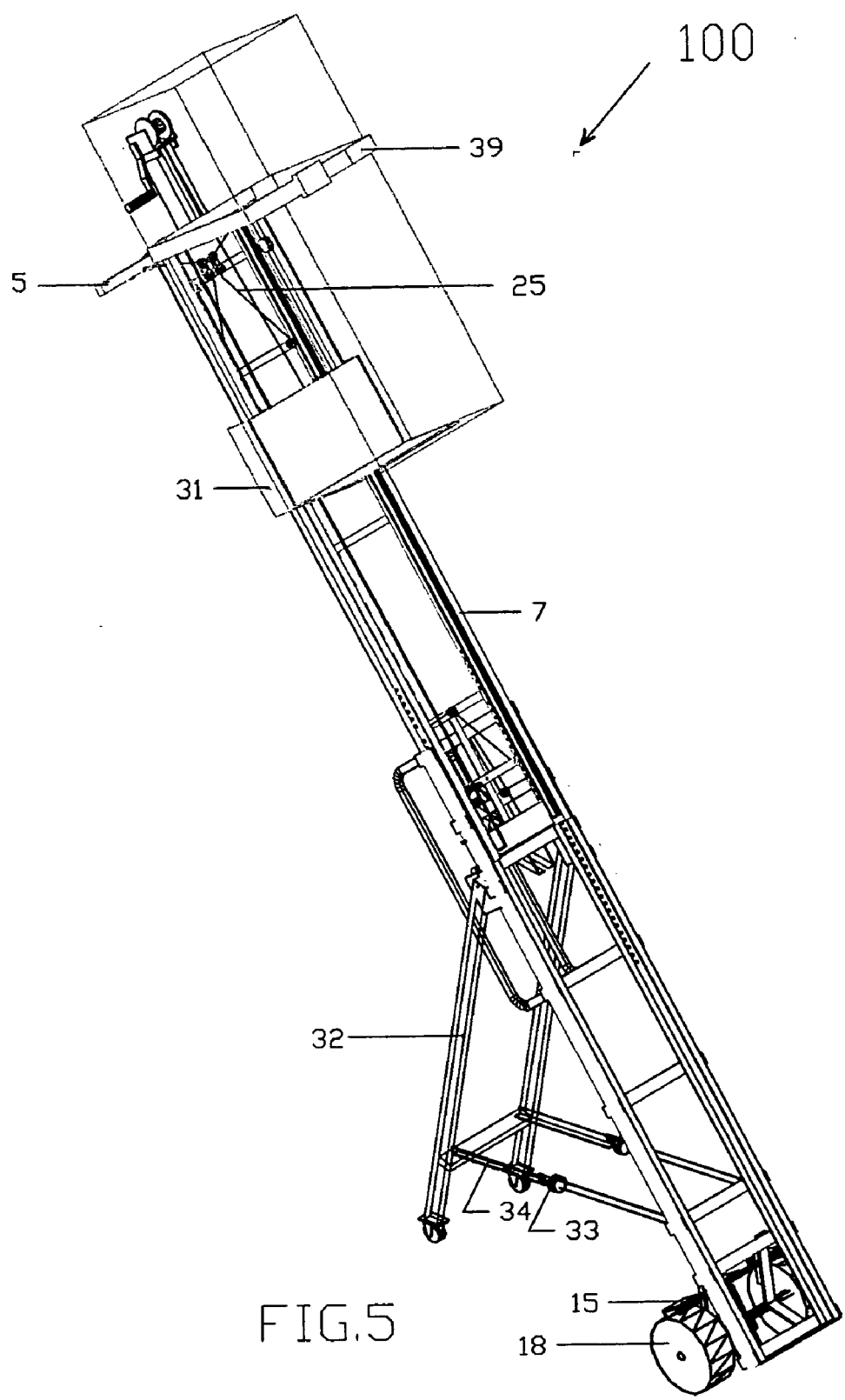
FIG. 5 is a front isometric drawing of the dolly of the present invention telescoped to full extension and loaded with a phantom load hoisted to its maximum height.

FIG. 5 shows dolly 100 in its fully extended configuration with locking devices 33 locked to prevent collapsing of support members 34, and brake system 15 activated to prevent rotation of axle assembly and wheels 18. From FIG. 5 it can be seen that dolly 100 could be positioned in its extended configuration at various angles with reference to the floor or ground surface, depending on the position of support member 32. Because of its angled configuration, dolly 100 is capable of providing access to an attic equipped with a pull-down staircase if the bottom section of the staircase remains folded.

FIG. 6 shows dolly 100 in its fully extended configuration. While the operator extends secondary member 7 from main member 12, support arms 5 are recessed into receiver tube 41. When secondary member 7 enters an attic access, the operator toggles lever 42 that causes cable and pulley system 25 to release a detent (not shown) in receiver tube 41. Release of the detent permits springs 26 to urge support arms 5 outward from their positions recessed into receiver tube 41. In their extended positions, support arms 5, which in an alternative embodiment may be shaped like hooks, span two adjacent attic rafters and provide support for the top of extended dolly 100.

With support arms 5 resting on attic rafters, locking devices 33 locked, and brake system 15 activated, dolly 100 is stable and secure. Then the operator may access the attic, and, with winch 1 and cable 27, hoist base member 31 and load 200 upward from the floor along the extended combination main and secondary members 12 and 7 until it is in position to be unloaded onto the attic floor.

After the load is removed from dolly 100, the operator, while still in the attic, may use winch 1 to lower base member 31 from the attic to the floor or ground surface. Then the operator may leave the attic, and, from the floor or ground surface, toggle lever 42 so that cable and pulley system 25 operates to retract support arms 5 into receiver tube 41, thereby disconnecting the top of dolly 100 from the attic rafters upon which it had been supported during the hoisting operation.

The operator may then use winch 2 to lower secondary member 7 from its extended position in the attic to its non-extended position telescoped into main member 12. Locking devices 33 may be released, support members 34 collapsed, and support member 32 rotated into its storage position substantially adjacent and parallel to main member 12. Brake system 15 may be released, and dolly 100 moved to a storage location.

It will be apparent to those with ordinary skill in the relevant art having the benefit of this disclosure that the present invention provides an apparatus for moving objects and hoisting objects from a floor or surface into an attic above the floor or surface. It is understood that the forms of the invention shown and described in the detailed description and the drawings are to be taken merely as presently preferred examples and that the invention is limited only by the language of the claims. While the present invention has been described in terms of one preferred embodiment and a few variation thereof, it will be apparent to those skilled in the art that form and detail modifications may be made to those embodiments without departing from the spirit or scope of the invention.

What is claimed is:
1. A dolly comprising:
a substantially rectangular planar main member having a top edge, a bottom edge, two side edges longer than the top and bottom edges, a front face, and a rear face;
a substantially rectangular planar secondary member having a top edge, a bottom edge, two side edges longer than the top and bottom edges, the secondary member having the capability of being telescoped from the main member so that the main and secondary members form a substantially continuous and planar combined member having the bottom edge of the secondary member proximate the top edge of the main member, and the secondary member having a front face oriented in the same direction as the front face of the main member, and the secondary member having a support arm capable of being extended from and retracted into a receiver tube fixed to the secondary member at the urging of controls located on the main member;
a base member slidably attached to the main member and substantially perpendicular to the main member plane near the bottom edge and on the front face of the main member, the base member being capable of supporting a predetermined load;
a handle protruding from the rear face of the main member near the top edge of the main member and substantially perpendicular to the plane of the main member;
an axle assembly attached near the bottom edge of the main member, the axle assembly having one or more transport wheels that support the dolly on a base surface;
a substantially rectangular planar support member having a top edge, a bottom edge, and two side edges longer than the top and bottom edges, the top edge of the support member being rotatably and slideably attached to the main member between the top edge of the main member and the center of the main member such that the top edge of the support member is parallel to the top edge of the main member, and the support member depends from the rear face of the main member, the support member having an axle assembly attached near the bottom edge of the support member, the axle assembly having one or more support wheels;
a support strut having a first end rotatably attached to the main member and a second end rotatably attached to the support member, the support strut being capable of telescoping and locking;
a brake on at least one of the transport wheels;
a strap for releasably attaching a load to the secondary member while the load is resting on the base member;
a first winch attached to the rear face of the main member near the top edge of the main member;
a second winch attached to the secondary member near the top edge of the secondary member;
a first system of pulleys through which a first cable is led, the first end of the first cable being attached to a drum on the first winch, and the distal end of the first cable being attached proximate the bottom edge of the secondary member, the first system of pulleys and the first cable being capable of telescoping the secondary member from the main member under the urging of the first winch; and a second system of pulleys through which a second cable is led, the first end of the second cable being attached to a drum on the second winch, and the distal end of the second cable being attached to the base member, the second system of pulleys and the second cable being capable of sliding the base member and the predetermined load a predetermined distance along the telescoped combined member under the urging of the second winch.

* * * * *